United States Patent Office 2,827,301
Patented Mar. 18, 1958

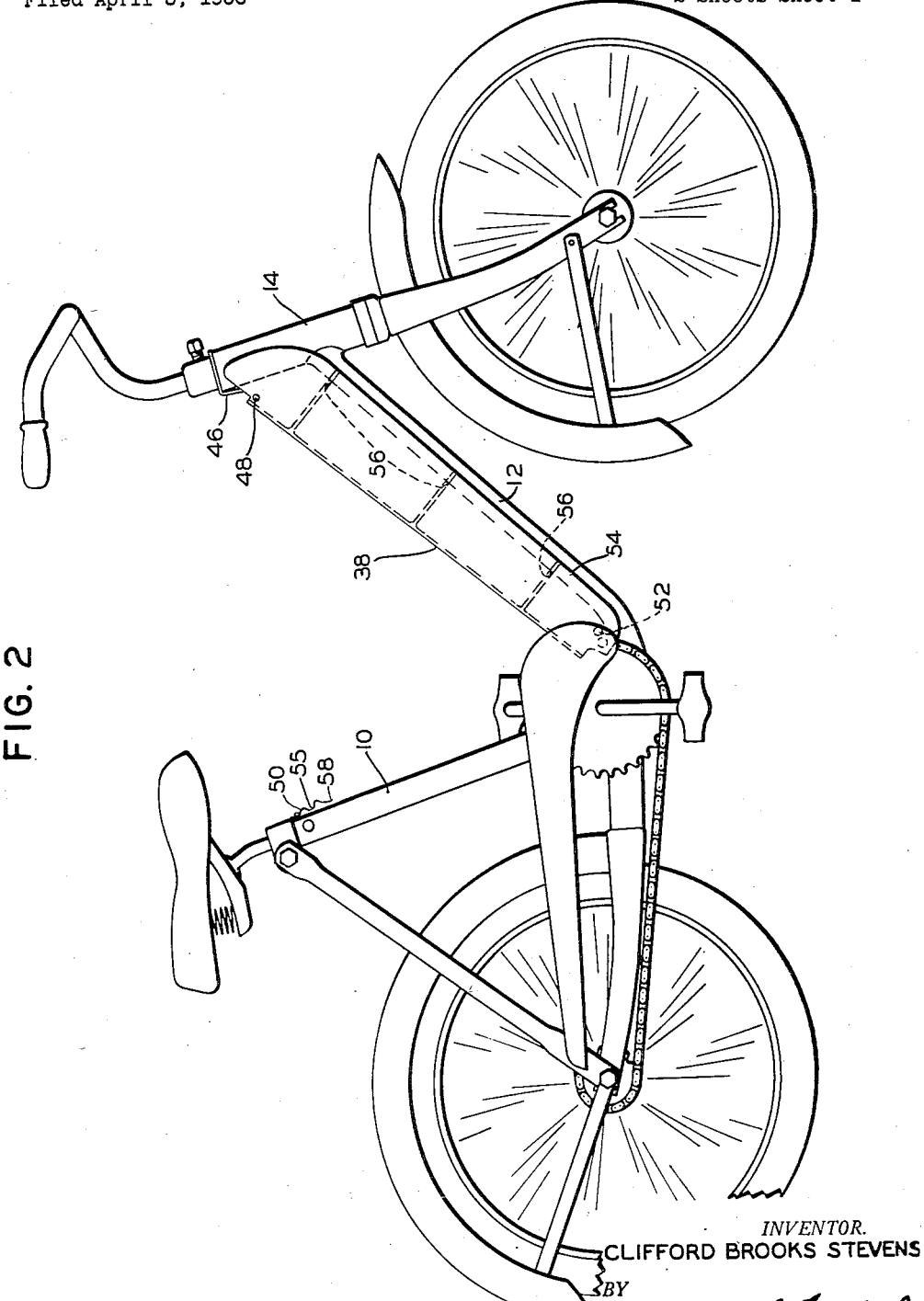

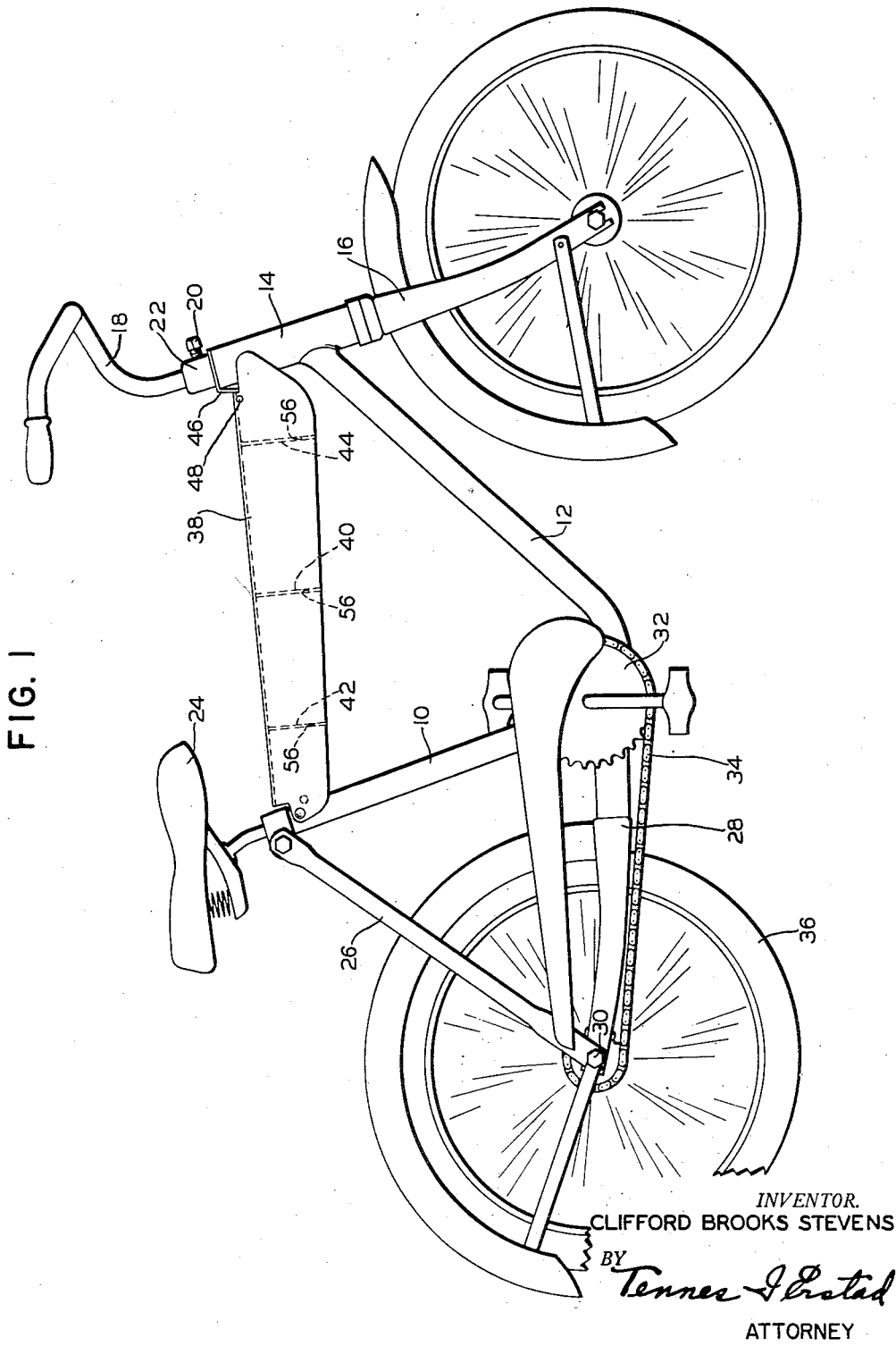

2,827,301

CONVERTIBLE BICYCLE FRAME

Clifford Brooks Stevens, Milwaukee, Wis., assignor, by mesne assignments, to American Machine & Foundry Company, New York, N. Y., a corporation of New Jersey Application April 5, 1956, Serial No. 576,430

4 Claims. (Cl. 280—7.11)

This invention relates to bicycles and more particularly to bicycles that can be readily converted into either a boy's or a girl's bicycle. The invention is especially well suited for use on "sidewalk bicycles."

Various devices have been made for making bicycles convertible. Some of such devices have been rather complex in their design and as a result have not met with public acceptance, while others required a major rearrangement of parts.

It is the purpose of the present invention to design a bicycle which can be readily converted either into a girl's bicycle or a boy's bicycle on a moment's notice which will be of simple design and yet durable in construction.

A further object is to provide a convertible bicycle which will have the crossbar made in the form of a tank which is pivoted at one end and disengageable at the end connected to the saddle post so that it can be lowered parallel to the diagonal frame member of the bicycle which is connected with the headpost of the bicycle.

Another object of this invention is to provide a bicycle having a tank which is disengageable at one end to permit that end to be lowered to facilitate mounting the bicycle by a rider.

A further object of this invention is to provide an upper crossbar for a bicycle which is sufficiently rugged to withstand the use to which such crossbar is normally subjected.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1 is a side view of the bicycle showing the crossbar or tank in raised position so as to resemble a boy's sidewalk bicycle.

Figure 2 is a side view of the bicycle showing the bar or tank lowered so that it is parallel to the diagonal bar of the bicycle.

The bicycle frame that I have used to illustrate the invention has a conventional saddle post 10 and a diagonal bar 12 interconnecting the lower end to the saddle post 10 to the headpost 14. A front frame member comprising a conventional front fork 16 is inserted through the headpost 14 and has connected thereto at the upper end, a handle bar 18 by suitable means such as the clamping nut 20 and the collar 22.

The upper end of the saddle post has a seat 24 adjustably secured therein by suitable means. A rear frame member comprising an upper rear fork 26 and a lower rear fork 28 extends from the saddle post 10 and supports the rear axle 30 of the bicycle. The pedal crank 32 may be supported by any suitable means of the lower rear fork 28 or on the diagonal bar 12 in a manner well known in the art. The pedal crank 32 drives the sprocket chain 34 which in turn drives the rear wheel 36 of the bicycle.

The simulated tank 38 in the embodiment shown to illustrate the invention consists of a sheet of metal folded over to impart to it the configuration of a crossbar or tank which has sides that are spaced apart a distance substantially equal to the diameter of the diagonal cross bar 12. Suitable supporting ribs 40, 42, and 44 are mounted transversely in between the folded sheets of the tank 38 to impart rigidity to the same. If the side walls of the tank 38 are made from a heavy gauge metal it will not be necessary to employ any supporting ribs.

Similarly, if the tank walls are interconnected at their lower side to form a closed tank, it is not necessary to employ any supporting ribs, since the sidewalls of the tank are thus adequately supported against collapse.

The front end of the tank 38 is hingedly mounted on a bracket 46 which is supported on the headpost 14. A suitable pivot 48 extends through the bar or tank 38 to pivotally mount the same on the bracket 46.

The opposite end of the bar or tnak 38 may be secured to the upper end of the saddle shaft 10 by any suitable means. For purposes of illustration I have shown such means to consist of a simple spring 50 which snaps around a suitable detent 52 which is mounted at the end of the bar or tank 38. The detent 52 cams the spring lock 50 outwards allowing the detent to slip into the locking socket or locking opening formed in the spring 50 so as to hold the tank or bar in place in its upper position.

When the tank 38 is lowered to its inclined position shown in Figure 2, the bottom portion of the tank 54 may be so shaped that it partially drapes over the diagonal crossbar 12. Suitable means are provided for firmly holding the tank in place on the bar 12 such as the spring lock 50, or if desired, the bottom sides of the tank may be sufficiently close to each other so as to grip the sides of bar 12.

The extent to which the tank 38 covers the crossbar 12 is limited by the curved surfaces 56 of the brackets or ribs engaging with the bar 12.

It will be appreciated that while I have shown tank 38 to be a simulated tank, a real tank having a place to store tools or a battery could be employed in lieu thereof.

It will also be appreciated that instead of the locking structure that I have shown any other suitable device could be used in lieu thereof, such as a hook, a latch or even a bolt and nut passing through the tank and saddle post 10. When the user of the bicycle desires to convert the bicycle to a boy's bicycle all the user has to do is to grip the tank 38 and raise it to its upper position. As the detent 52 moves upwardly it engages with the camming face 58 of spring 50 causing the detent 52 to slip into the detent receiving notch 55 formed in the spring 50.

When the user desires to convert the bicycle from a boy's bicycle to a girl's bicycle all that he has to do is depress the finger release 58 of the spring 50. This causes the notch 55 to disengage from the detent 52, allowing the tank 38 to be swung downwardly. The sides of the tank 54 then slip around the sides of the diagonal bar 12 so as to firmly seat the tank against the bar up against the curved surfaces 56 of the supporting brackets 40, 42, and 44.

It will be noted that when the tank 38 is in the inclined position or the girl's position, it is completely out of the way and there is nothing to encumber the rider. When the tank 38 is in its upper position it adds additional strength to the bicycle frame.

The invention herein above described may be varied in construction within the scope of the claims, for the particular device selected to illustrate the invention is but one of many possible embodiments of the same. The

What is claimed is:

1. A convertible bicycle having a headpost, a front fork pivotally mounted in said headpost, a seat post, a rear fork connected with said seat post, a diagonal crossbar connecting the headpost with the rear fork, a simulated tank having one end thereof pivotally connected to the headpost and having a length substantially the same as said cross bar, means formed on said tank for supporting the sides thereof in a fixed position relative to each other, the underside of said tank being open so as to permit it to seat itself on said diagonal crossbar and means formed at the opposite end of said tank member for detachably securing the other end of said simulated tank to the upper end of the seat post.

2. A convertible bicycle comprising a headpost, a front fork of a bicycle pivotally mounted in said headpost, a saddle post, a seat saddle connected to the top of said saddle post, rear forks connecting the saddle post to the rear axle of a bicycle wheel, a diagonal crossbar interconnecting the headpost with the lower end of the saddle post, a crossbar member pivotally connected at one end to the headpost and having a length substantially the same as the diagonal crossbar and means formed on the opposite end of said crossbar member for detachably connecting said opposite end of said crossbar member to the upper end of said saddle post, said crossbar member having a configuration on its underside causing it to straddle the diagonal crossbar when the crossbar member has been lowered parallel to said diagonal crossbar.

3. A convertible bicycle comprising a saddle post, means for connecting the saddle post to the rear axle of a bicycle, a headpost, a front fork member pivotally mounted in said headpost and having a bicycle wheel mounted at the lower end thereof, a simulated tank comprising a sheet of metal bent on itself to form an inverted U in cross section, ribs formed between the sides of said inverted shaped tank to support said sides against movement relative to each other, said sides of said simulated tank being spaced a distance substantially equal to the diameter of a diagonal crossbar interconnected at one end to the headpost and at the other end to the lower end of the saddle post; a pivotal connection for said tank being at a point which will cause the lower edge of the simulated tank to be substantially parallel to the diagonal crossbar member when placed in lowered position and the sides to extend over the opposite sides of said diagonal crossbar member, and a lock mounted in the opposite end of said saddle post for detachably connecting the opposite end of said simulated tank to the upper end of said saddle post.

4. A convertible bicycle comprising, a rear frame member, a front frame member, a diagonal bar interconnecting said front frame member with said rear frame member, the lower end of said diagonal bar being connected to the rear frame member, an upper crossbar member comprising a sheet of metal bent over itself and having a diagonal bar receiving opening formed along the length of the underside thereof and having a pivotal connection at one end to said front frame member, said pivotal connection being positioned so that when the other crossbar member is lowered the lower side thereof will straddle the diagonal member, and means positioned at the opposite end of said diagonal member to permit it to be detachably locked when in raised position to the upper end of said rear frame member.

References Cited in the file of this patent

UNITED STATES PATENTS

| | | |
|---|---|---|
| D. 175,674 | Day et al. | Jan. 27, 1955 |
| 620,459 | Koehler | Feb. 28, 1899 |
| 2,747,889 | Mueller | May 29, 1956 |

FOREIGN PATENTS

| | | |
|---|---|---|
| 979,506 | France | Dec. 13, 1950 |
| 1,078,289 | France | May 5, 1954 |